May 27, 1952 W. G. COE 2,598,356

REMOTE SWITCH CONTROL

Filed Nov. 19, 1949 2 SHEETS—SHEET 1

INVENTOR.
WILLIAM G. COE
BY
Arthur P. Woolfolk
ATTORNEY

INVENTOR.
WILLIAM G. COE
BY
Arthur R. Woolfolk
ATTORNEY

Patented May 27, 1952

2,598,356

UNITED STATES PATENT OFFICE 2,598,356

REMOTE SWITCH CONTROL

William G. Coe, East Stroudsburg, Pa., assignor to McGraw Electric Co., Milwaukee, Wis., a corporation of Delaware Application November 19, 1949, Serial No. 128,385

6 Claims. (Cl. 177—353)

This invention relates to a receiver for wired radio remote control systems.

Objects of this invention are to provide a wired radio receiver which is so constructed that it will permit the remote control of any selected group of a plurality of groups of power driven devices only when the selected receivers are energized by a carrier current of a predetermined frequency and only when a particular receiver or group of receivers is energized by the carrier current of such frequency which has been coded correctly to the required length and spacing in a predetermined manner to thereby prevent the operation of any selected group of receivers on any signal even of the predetermined frequency unless it has the correct coding. It frequently happens that in power lines there are many high frequency disturbances due to surges, lightning, to defective equipment, and to many other causes so that carrier currents of many different frequencies are produced in a haphazard and unpredictable manner.

This invention, however, as stated hereinabove, has for its primary object the provision of a receiver which is so constructed that it responds only to the particular predetermined carrier frequency and also only when the carrier current is interrupted at suitable intervals and is on for suitable lengths of time, thereby providing a definite coded signal to which the selected receiver will respond.

It, therefore, follows that a secondary primary object of the invention is to provide receivers which are so constructed that they may be adjusted, so that they will respond in a selective manner, so that any group may be energized without energizing any other group and to so coordinate the operation of the receiver of any group that it will not respond to extraneous and undesirable carrier currents which are generated in a haphazard manner and which are not coded in the precise manner to which the receiver is adjusted.

A further object of this invention is to provide a series of receivers which are so arranged in the system that all of the receivers of any given group are put into the same position at the first signal that is sent out from the control station for that particular group so that, if, for instance, certain of the receivers of that group are in the "on" position and others of that group are in the "off" position, that when an "on" signal is sent out from the control station, all of the receivers of that group will be put in the "on" position, if not already so, or, on the other hand, are so arranged that all of the receivers of that group will be put in the "off" position, if not already so, when an "off" signal is sent from the control station.

An embodiment of the invention is shown in the accompanying drawings, in which.

Figure 3:
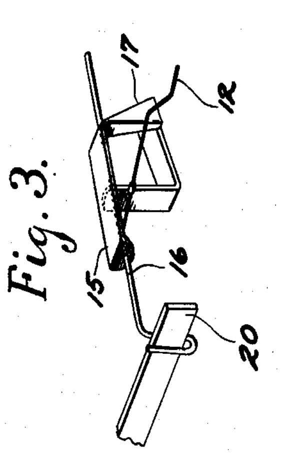
Figure 3 is a perspective view of the wiper.
Figure 5:
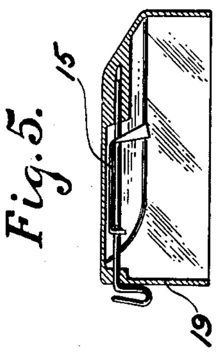
Figure 5 is a sectional view through the cover of the relay with the wiper shown in full lines and with all other portions of the apparatus removed.

The receiver is indicated generally by the reference character 1 and is connected to the mains or power lines 2 and 3. This may be a grounded neutral system, the grounded neutral being indicated by the reference character 4, and may comprise the ordinary lighting supply system for domestic purposes or any other systems of this general type. The power lines 2 and 3 are selectively connected to one or more loads indicated generally by the reference character 5. The power lines or mains are also utilized to conduct the carrier current to a signal filter indicated in block diagram by the reference character 6. This signal filter is connected to the ground as indicated at 7 on one side and to the terminal 8 of the receiver which is connected to one of the mains, for example, the main 3. The signal which is passed by the signal filter 6 is conducted to a rectifier 9 which supplies rectified current to the swinging coil 10 of a sensitive relay indicated generally by the reference character 11. This relay is provided with a light pointer or conducting arm 12 which is connected to the terminal 8 and consequently to the main 3. It is also provided with a stationary magnetized contact 13 and it is to be noted that the light conducting pointer or switch arm 12 of the relay carries a small cylinder or other shaped member 14 of magnetic material, so that when the switch arm arrives at the stationary contact 13, it will be magnetically lightly held to such contact, although it is to be understood that the pointer 12 is biased in a counterclockwise direction as shown by the arrow in accordance with the usual practice. The pointer 12, when once moved into engagement with the stationary contact 13 would remain in such position unless mechanically moved from this closed circuit position. The mechanical means for moving the pointer or conducting arm 12 from the stationary contact 13, consists of a wiper indicated by the reference character 15. This wiper is more clearly shown in Figures 3, 4, and 5, and is provided with an arm 16 rigidly secured thereto which forms the support and also the operating means for the wiper 15. The wiper 15 has a tongue 17 that extends into the path of movement of the pointer or arm 12, as shown most clearly in Figure 3, so that when the wiper is moved outwardly, that is to say, to the left as viewed in Figure 3, its finger or tongue 17 will wipe or move the pointer 12 away from contact with the magnetized stationary contact 13 and the biased arm 12 will immediately swing to its neutral position against the stop 18, see Figures 1 and 4.

Figure 4:
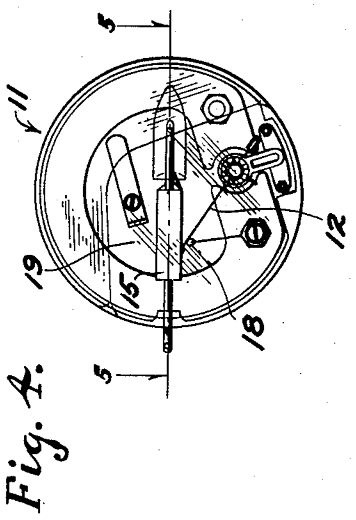
Figure 4 is a view looking directly into the sensitive relay.

It is to be noted also, particularly from Figure 4, that when the pointer or conducting arm 12 is in its neutral position, that it is out of contact with the wiper 15. The wiper 15 is carried in the insulating cover or housing 19 of the sensitive relay 11 and inasmuch as this housing or cover 19 is formed of insulating material, it is apparent that the wiper is normally insulated from other portions of the apparatus.

It is to be noted that when the wiper 15 is in the position shown in Figures 1, 3, 4, and 5, that it is out of the path of movement of the arm 12 and the arm 12 can, upon energization, be swung into contact with the stationary contact 13 without engaging the wiper. However, if the wiper 15 were pulled to the left, as viewed in Figures 3, 4, and 5, or downwardly, as viewed in Figure 1, that is to say outwardly from the sensitive relay 11, it is apparent that its tongue or finger 17 would be in the path of movement of the arm 12 and consequently if the arm 12 were then energized and swung in a clockwise direction, it would not engage the stationary contact 13, but instead would engage the wiper 15 and thus electrically connect the wiper 15 with the line or main 3, see Figure 1.

During this period of contact between the arm 12 and the wiper 15, it is apparent that the wiper 15 would be energized or "alive."

Means are provided for periodically oscillating the wiper back and forth and this means will be described hereinbelow. The means for mechanically operating the wiper consists of a pivotally mounted cam follower or conducting arm 20 which is provided with a finger 21 riding on the fiber or other insulating disk 22 of the timer indicated generally by the reference character 23. This timer consists of the fiber disk, as stated hereinabove, which is driven through reduction mechanism, not shown, from a timer driving motor indicated generally at 24. It is intended that the disk 22 be slowly rotated, so that it makes one revolution, for instance, in one minute, though of course other timing could be employed if so desired. The motor 24 is a self-starting synchronous motor which is ordinarily not energized but which is arranged to be energized whenever a suitable signal arrives at the signal filter 6 as will appear hereinafter.

Figure 1:
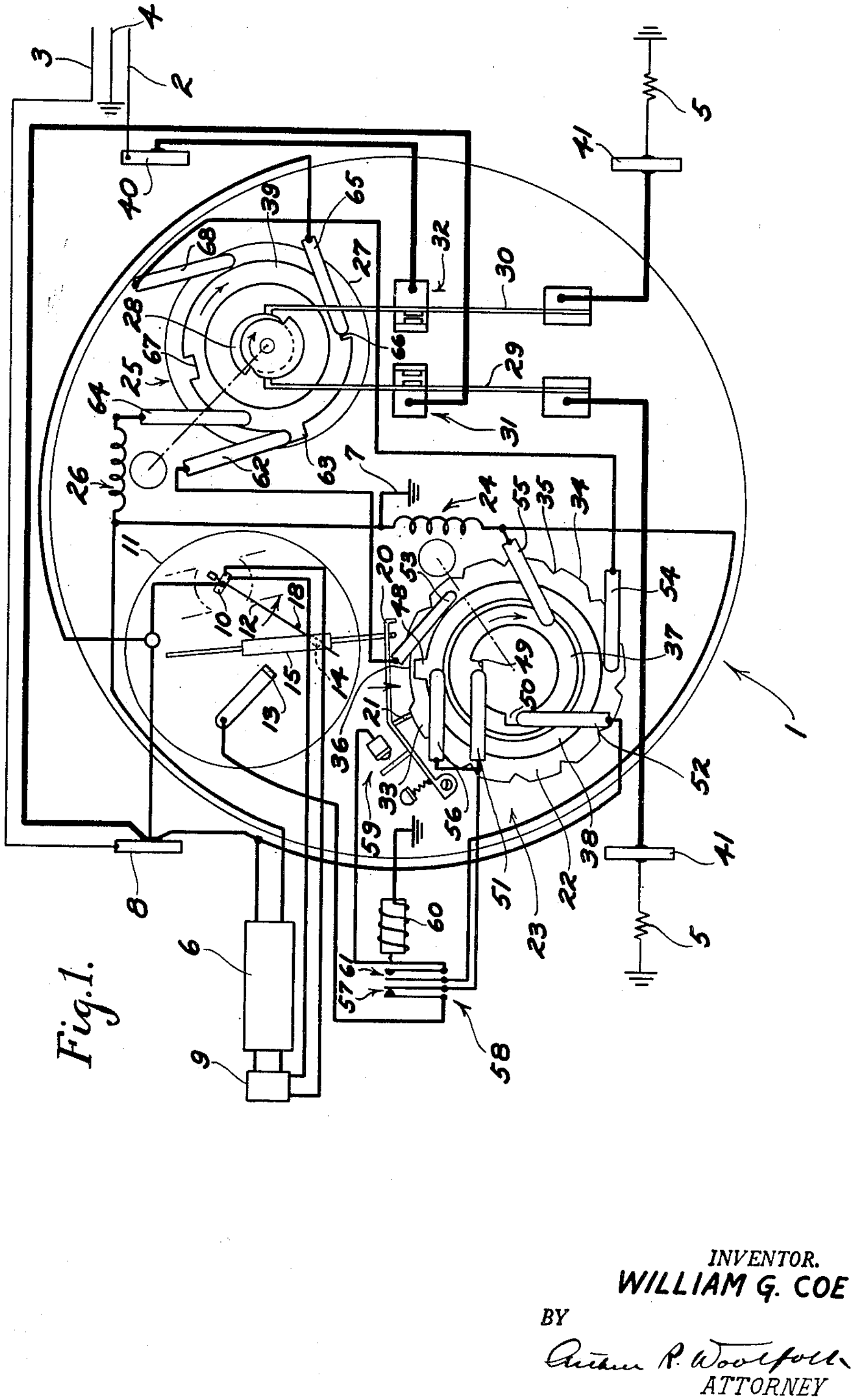
Figure 1 is a view partly diagrammatic, showing the receiver in its neutral or start position.

The timer 23, it is to be noted at this point, controls a power switch operating means indicated generally by the reference character 25 in Figure 1, which power switch operating means includes a self-starting synchronous motor 26 which drives through reduction mechanism, not shown, a fiber or other insulating disk 27 and a pair of insulating cam members 28, which latter operate the movable members 29 and 30 of the power switches indicated generally at 31 and 32. These power switches control the connection of the loads 5 to the power lines or mains 2 and 3 as is obvious from an inspection of Figure 1, so that when the motor operates to drive the disk 27 approximately a half revolution, the switches 31 and 32 close and thus connect the loads 5 with the power lines 2 and 3. When the disk 27 is rotated another half revolution the power switches 31 and 32 are again opened and are in the position shown in Figure 1.

It is to be noted that the timer 23 has its fiber disk 22 provided with a plurality of raised portions, the first of which 33 is of relatively longer extent than the remaining portions 34. The successive portions are separated by slots 35 and it is preferable to have a single, relatively long slot or depression 36 just ahead of the enlarged, raised portion or cam member 33. The relative proportion of the cam members 33 and 34 of the fiber disk 22 is more clearly shown in Figure 2. It is to be noted also from a comparison of Figures 1 and 2 that the fiber disk 22 is provided with two sectors indicated by the reference characters 37 and 38. These sectors are, respectively, the timer sector and the timer group sector. As a matter of fact, in the construction of the device, the sectors 37 and 38 are located on the underside of the fiber disk 22 as shown in dotted lines in Figure 2, such figure being the top or face view of the fiber disk. However, for the sake of clearness the sectors have been shown as if they were located on the top or outer face of the fiber disk 22 in Figure 1. In a similar manner the switch disk sector 39 has been shown as though it were located on the outer face of the fiber disk 27 in Figure 1 for the sake of clearness though, in reality, this sector also, though not shown in the drawing, is located on the under side of the fiber disk 27, similarly to the sectors 37 and 38 of the fiber disk 22 of the timer 23. In each instance, the cooperating brushes are located on the under side of the fiber disks.

It is to be noted that the receiver is provided with four terminals, one of which terminal 8, has already been described. A second terminal 40 is connected to the other power line 2, the terminal 8 being connected to the power line or main 3. The receiver is provided with a pair of output terminals indicated at 41 which are connected to the loads 5. It is, of course to be understood, that one or two loads may be employed. Also it is to be understood that the load could be connected between the output terminals 41, if so desired, in which case it would have the full voltage between the power lines or mains 2 and 3.

Figure 2:
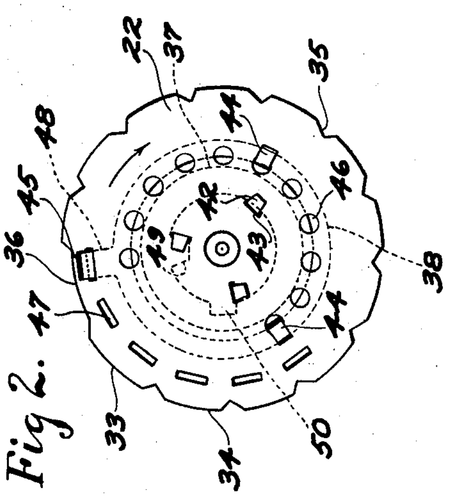
Figure 2 is a view of the timer disk removed from other portions of the apparatus.

It is to be noted that the timer sector 37 is secured by means of a plurality of ears or tongues 42, see Figure 2, which passes through slots 43 in the fiber disk 22 of the timer and that the timer group sector 38 is provided with a plurality of tongues or lugs 44, 44, and 45, which extend respectively, through the corresponding openings 46 for the lugs 44, 44, and through the corresponding opening 47 for the lug 45. In this way, it is possible to adjust the timer group sector 38 which, for simplicity, will hereinafter be called the group sector. The group sector, therefore, can be adjusted to different relative positions around the fiber disk 22 to thereby vary the position at which the contact tongue 48, which is a continuation of the lug 45, will be placed. This positioning of the contact lug 48 determines the particular group in which the receiver will be placed. For example, in the position shown, it is in group one. When it is shifted so that the lug 45 extends through successive openings 47 in the timer disk 22, see Figure 2, the receiver will thus be adjusted to different groups as will appear hereinafter.

It is to be noted with reference to the timer sector 37 that this sector is provided with a starting lug 49 and with a notch or cutout portion 50, see Figures 1 and 2.

Further it is to be noted that there are six brushes associated with the timer disk 22. The first brush to be described is the timer starting brush 51 and the next brush is the timer running brush 52. The third and fourth brushes are the "on" and "off" brushes, respectively, indicated by the reference characters 53 and 54, and the pick-up brush 55. The timer pick-up brush 55 is connected to the timer motor 24 on one side and the other side of the motor is grounded as indicated at 7. One further brush need be described in connection with the timer disk 22. This brush is indicated by the reference character 56 and is the brush that conducts electric current to the group sector 38 in a manner hereinafter to appear.

It is believed that with the description thus far given, it will be clearer if an incoming signal is traced together with the resulting functions.

Assume that the parts are in the position shown in Figure 1 which corresponds to the "home" or neutral position. Suppose a signal of the proper frequency is transmitted. This signal is filtered by the signal filter 6 which, in reality, is a blocking filter and blocks the power current from passing directly through the filter. It, however, freely passes the signal at the predetermined selected frequency.

Assume that this signal, for instance, exists for a period of three seconds for the purpose of illustration. The signal which is filtered out by the filter 6 passes to the rectifier 9 which applies direct current to the coil 10 of the sensitive relay 11 and moves the arm 12 to the left, as viewed in Figure 1, into engagement with the stationary contact 13. The arm is temporarily, magnetically held in this position as previously described due to the fact that it is provided with a member 14 of magnetic material and due to the further fact that the stationary contact 13 is magnetized.

Under these conditions the line 3 is connected through the normally closed contacts 57 of the lock-out relay 58 to the brushes 51 and 56. Current now flows from the line through the brush 51 to the timer sector 37 and to the timer pick-up brush 55 and from that point to the timer motor 24. The timer motor, therefore, drives the disk 22 in the direction indicated and before the lug 49 passes from the brush 51, the running brush 52, which is in the slot 50, passes over into contact with the timer sector 37 and thus directly connects the timer sector 37 with the main 3, so that the timer motor continues to run for one complete revolution of the timer disk 22 independently of any further signal. As the timer disk 22 rotates, the finger 21 rides into the first notch of the series of notches 35 and the metallic wiper finger 20 causes the wiper 15 to wipe the arm 12 of the relay 11 free of the stationary contact 13. The arm 12, therefore, immediately swings over to its neutral position, as shown in Figure 1, and interrupts the connection between the stationary contact and such arm. The timer, however, completes one full cycle by causing the timer disk to complete a full revolution once it has started. If no spurious signal is present, the arm 12 remains in the position shown in Figure 1. However, if an unwanted or spurious signal is being transmitted over the mains, the arm 12 swings to the left but cannot arrive at the stationary contact 13. Under this condition, the arm 12 contacts the metallic wiper 15 and electrically connects such wiper with the main 3. The wiper, in turn, electrically connects the metallic wiper arm 20 with the main 3 and thus the arm 20 is electrically "alive." Inasmuch as the arm 20 is in its down-most position, as viewed in Figure 1, it is apparent that the monitoring switch indicated at 59 will be closed, such monitoring switch being composed of a movable arm carried by the arm 20 and the stationary contact as shown in Figure 1. The monitoring switch is connected through the actuating coil 60 of the lock-out relay 58 and causes the relay to open the normally closed contacts 57 and to close the normally open contacts 61, thus establishing a holding circuit for this lock-out relay as the circuit extends to the now electrified brush 55 of the timer 23. Under these conditions, the brushes 51 and 56 are dead and the group sector 38 is also dead and no current can pass to the switch operating motor 26 when the lug 43 arrives at the "on" brush 53. On the other hand, if no spurious signal had been received, the monitoring switch, though closed, would carry no current since the arm 12 of the sensitive relay 11 would remain in its neutral position as shown in Figure 1 and consequently the lock-out relay 58 would not operate.

Assume that no spurious signal had been received. When the next signal is sent out, which for the sake of illustration, may consist of a two-second signal of the selected frequency separated from the previous three-second signal by a two-second gap, it is apparent that the wiper arm would then have arrived at the next projection 34 of the timer disk and the arm 12 of the sensitive relay 11 could now swing freely into contact with the stationary contact 13. This would connect the supply brush 56 with the main 3 and current would then flow to the group sector 38 and when the lug 48 came in contact with the "on" brush 53 of the load switch motor 26, such motor would start, since the "on" brush 53 is connected to the "on" brush 62 of the load switch disk and since such "on" brush is at this time in contact with the lug 63 of the switch disk sector 39. Current now flows from the switch disk sector 39 through the load motor, pickup brush 64 through the switch motor 26 to the ground 7 and the motor starts to operate. As soon as the motor drives the disk 27 a slight distance, the load motor run brush 65 passes from the notch 66 and contacts the sector 39, thus establishing a direct circuit from the load motor to the main 3. The load motor continues to run until the brush 65 rides off the switch disk sector 39 into the notch 67.

It will be seen that the disk 27 has executed a half revolution and consequently the double cam 28 has also executed a half revolution and the power switches 31 and 32 are closed. The timer motor continues to operate until it executes a full revolution at which time it stops as the brush 52 again arrives at the notch or cut-out 50, and the timer sector 37 is now dead as the contact arm 12 has been wiped clear of the stationary contact 13 as the finger 21 of the wiper arm 20 has dropped into a succeeding notch or notches 35 during the revolution of the timer disk 22.

The load remains on until an "off" signal is sent. This "off" signal continues for a period of three seconds which starts the timer motor as previously described. The timer motor continues to rotate and the arm 12 of the relay 11 is wiped clear of the stationary contact 13. At the appropriate time when the lug 48 of the timer disk 22 contacts the "off" brush 54 of the timer disk, a second signal of two seconds duration is transmitted and at this time the finger 21 is riding on the corresponding elevation 34 of the timer disk 22. The arm 12 of the relay 11 responding to the two-second signal swings over into contact with the stationary contact 13 and thus connects the group sector 38 with the main 3 and thereby energizes the load switch motor 26, for at this time the lug 63 of the load switch motor is in contact with the "off" brush 68 of the load switch motor. The load switch motor executes a half revolution as previously described and thereby opens the load switches 31 and 32.

It will be apparent from the description hereinabove given that when an "on" signal is given, all of the receivers of the selected group will be operated, so that their power switches are in the "on" position, whether they are in the "on" position or whether they were initially in the "off" position. Similarly, it is apparent that when an "off" signal is given, that all of the receivers of that particular group which were selected for this "off" signal, will be placed in the "off" position for their power switches, whether they were initially in the "off" position or in the "on" position. Thus, it is clear from the above, that each group will be correctly positioned for the first coded signal that is sent out, whether it be an "off" signal or an "on" signal.

It will be seen that the receiver is so constructed that it will respond to coded signals only, although spurious uncoded signals may be impressed on the power lines of the predetermined frequency. Unless these signals, even though they be of the same frequency are properly coded, the receiver will not respond.

It is also apparent that properly coded signals can be sent out of the power line and will selectively control the particular group of receivers which are set for that particular signal. In the form shown, by proper adjustment of the group sector 38 in the appropriate slot 47, with corresponding changes of the lugs 44, a receiver is placed in the desired group.

For example, a receiver in the second group will receive the two-second signal at a later period from that of the receiver in the first group, although both receivers will receive the three-second start signal. A similar explanation applies to each of the receivers in the succeeding groups.

It is also to be understood that transients, such as those produced by lightning, surges, or other causes will not cause undesirable operation of the receiver as the monitoring switch and lockout relay will prevent operation of the load switch motor under all spurious signal conditions.

It will be seen further that the receiver, though having the characteristics hereinabove enumerated, is nevertheless relatively simple and has been found reliable in operation.

Although this invention has been described in considerable detail, it is to be understood that such description is intended as illustrative rather than limiting, as the invention may be variously embodied and is to be interpreted as claimed.

I claim:

1. A receiver for a remote control system for connecting an electric power line to a load, said receiver comprising a signal filter arranged to pass a signal having a carrier current of a predetermined frequency transmitted over said power line, a sensitive relay actuated by energy passed through said filter and including a contact and a movable member arranged to be moved by energy passed by said filter and arranged to connect said contact to said power line, a timer including a self-starting synchronous motor normally connected to said contact, a load switch motor for operating a load switch, said timer having means for controlling said load switch motor effective only after said contact has been connected to the power line a plurality of times with a given time spacing, and means forming a portion of said timer for causing the continuous operation of said timer for one complete cycle after the initial connecting of said contact to said power line.

2. A receiver for a remote control system for connecting an electric power line to a load, said receiver comprising a signal filter arranged to pass a signal having a carrier current of a predetermined frequency transmitted over said power line, a sensitive relay actuated by energy passed through said filter and including a contact and a movable member arranged to be moved by energy passed by said filter and arranged to connect said contact to said power line, a timer including a self-starting synchronous motor normally connected to said contact, the movable member of said sensitive relay after operating being magnetically held in a position to maintain said contact connected to said power line and being biased towards an initial position, and wiper means driven from said timer for moving said movable member towards its initial position and interrupting the connection of said contact to said power line, a load switch motor for operating a load switch, said timer having means for controlling said load switch motor effective only after said contact has been connected to the power line a plurality of times with a given time spacing, and means forming a portion of said timer for causing the continuous operation of said timer for one complete cycle after the initial connecting of said contact to said power line.

3. A receiver for a remote control system for connecting an electric power line to a load, said receiver comprising a signal filter arranged to pass a signal having a carrier current of a predetermined frequency transmitted over said power line, a sensitive relay actuated by energy passed through said filter and including a first and a second contact and movable means arranged to be moved by energy passed by said filter, said movable means being arranged to selectively engage said first or said second contact and being connected to said power line, a timer including a self-starting synchronous motor normally connected to said first contact, said movable means and said first contact being arranged to be held in contact with each other temporarily and said movable means being biased towards its initial position, a wiper for wiping said means from said first contact and having a portion constituting said second contact, a load switch motor for operating a load switch, said timer having means for connecting said load switch motor to said power line, effective only after said first contact has been engaged by said movable means a plurality of times with a given time spacing, conducting means forming a portion of said timer for causing the continuous operation of said timer for one complete cycle after the initial engagement of said first contact by said movable means, and a lock-out relay for preventing actuation of said load switch motor when said movable means engages said second contact while a signal is being transmitted along said power line.

4. A receiver for a remote control system for connecting an electric power line to a load, said receiver comprising a signal filter arranged to pass a signal having a carrier current of a predetermined frequency transmitted over said power line, a sensitive relay actuated by energy passed through said filter and including a first and a second contact and movable means arranged to be moved by energy passed by said filter, said movable means being arranged to selectively engage said first or said second contact and being connected to said power line, a timer including a self-starting synchronous motor normally connected to said first contact, said movable means and said first contact being arranged to be held in contact with each other temporarily and said movable means being biased towards its initial position, a wiper for wiping said means from said first contact and having a portion constituting said second contact, a load switch motor for operating a load switch, said timer having means for connecting said load switch motor to said power line, effective only after said first contact has been engaged by said movable means a plurality of times with a given time spacing, conducting means forming a portion of said timer for causing the continuous operation of said time for one complete cycle after the initial engagement of said first contact by said movable means, and a lock-out relay for preventing actuation of said load switch motor when said movable means engages said second contact while a signal is being transmitted along said power line, said wiper being movable into a position to block said movable means from engagement with said first contact.

5. A receiver for a remote control system for connecting an electric power line to a load, said receiver comprising a signal filter arranged to pass a signal having a carrier current of a predetermined frequency transmitted over said power line, a sensitive relay actuated by energy passed through said filter and including a first and a second contact and movable means arranged to be moved by energy passed by said filter, said movable means being arranged to selectively engage said first or said second contact and being connected to said power line, a timer including a self-starting synchronous motor normally connected to said first contact, said movable means and said first contact being arranged to be held in contact with each other temporarily and said movable means being biased towards its initial position, a wiper for wiping said means from said first contact and having a portion constituting said second contact, a load switch motor for operating a load switch, said timer having means for connecting said load switch motor to said power line effective only after said first contact has been engaged by said movable means a plurality of times with a given time spacing, conducting means forming a portion of said timer for causing the continuous operation of said timer for one complete cycle after the initial engagement of said first contact by said movable means, and a lock-out relay for interrupting the connection between said power line and said load switch motor when said movable means engages said second contact while a signal is being transmitted along said power line.

6. A receiver for a remote control system for connecting an electric power line to a load, said receiver comprising a signal filter arranged to pass a signal having a carrier current of a predetermined frequency transmitted over said power line, a sensitive relay actuated by energy passing through said filter and including a first contact and a movable member connected to the power line and arranged to be moved by energy passed by said filter and having a movable second contact normally out of the path of movement of said movable member, a timer including a self-starting synchronous motor normally connected to said first contact, a load switch motor for operating a load switch, said timer including a cam driven by said synchronous motor and operating said movable second contact to move said second contact into and out of the path of said movable member of said sensitive relay, said timer having motor control means carried by said cam and adjustable with reference to said cam for controlling said load switch motor and effective to cause operation of said load switch motor only after said movable member has engaged said first contact a plurality of times with a given time spacing depending on the setting of said motor control means with reference to said cam, said timer including means connected to the movable second contact of said sensitive relay for preventing the actuation of said load switch motor when a spurious signal is received during the said time spacing, and means forming a portion of said timer for causing the continuous operation of said timer for one complete cycle after the initial connecting of said first contact to said power line.

WILLIAM G. COE.

REFERENCES CITED

The following references are of record in the file of this patent:

UNITED STATES PATENTS

| Number | Name | Date |
|---|---|---|
| 1,665,622 | Chauveau | Apr. 10, 1928 |
| 1,888,904 | Brauer | Nov. 22, 1932 |
| 2,203,358 | Koenig | June 4, 1940 |
| 2,263,389 | Koenig | Nov. 18, 1941 |
| 2,568,836 | Tobler | Sept. 25, 1951 |